(No Model.)

K. E. LATHROP.
APPARATUS FOR LOADING AND UNLOADING HAY.

No. 322,618. Patented July 21, 1885.

Attest:
T. Walter Fowler
H. B. Applewhaite

Inventor;
Kirke E. Lathrop
per atty.
A. H. Evans & Co.

UNITED STATES PATENT OFFICE.

KIRKE E. LATHROP, OF AFTON, IOWA.

APPARATUS FOR LOADING AND UNLOADING HAY.

SPECIFICATION forming part of Letters Patent No. 322,618, dated July 21, 1885.

Application filed October 1, 1884. (No model.)

*To all whom it may concern:*

Be it known that I, KIRKE E. LATHROP, a citizen of the United States, residing at Afton, in the county of Union and State of Iowa, have invented certain new and useful Improvements in Apparatus for Loading and Unloading Hay; and I do hereby declare that the following is a full, clear, and exact description thereof, reference being had to the accompanying drawings, making a part of this specification, in which—

Figure 1:
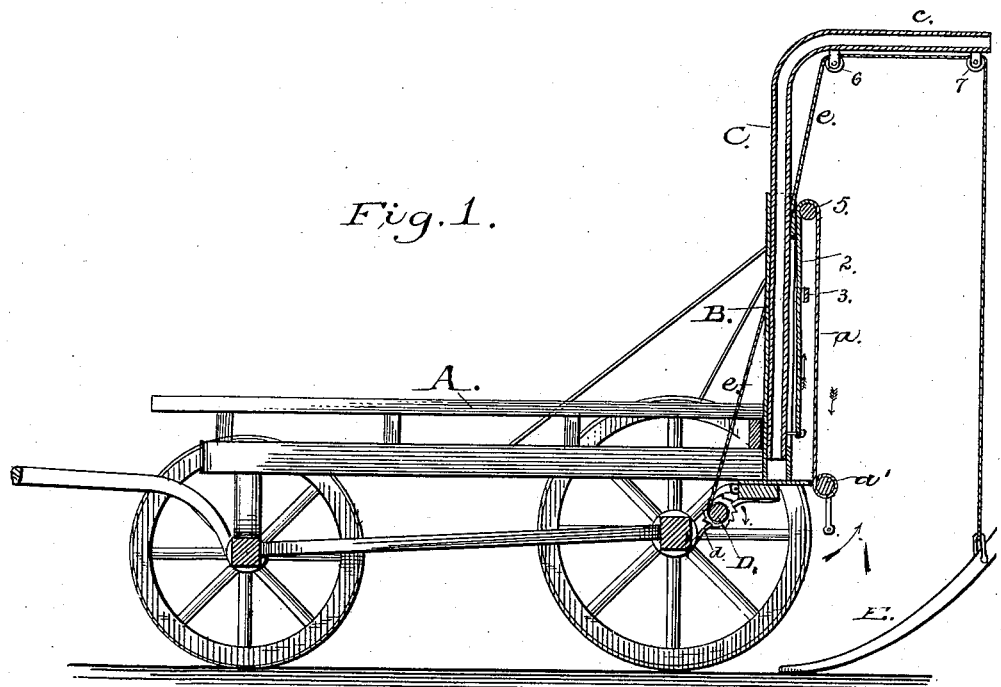
Figure 2:
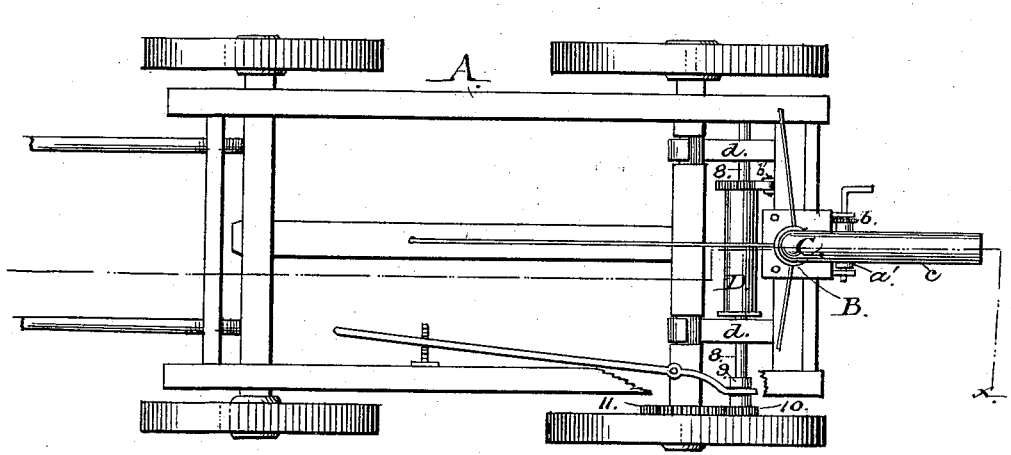

Figure 1 is a longitudinal vertical section through my machine which is mounted on the rear end of a wagon, the section being taken on line $x\ x$ of Fig. 2. Fig. 2 is a top plan view.

My invention relates to a device for loading and unloading wagons in the field or in the barn; and it consists in the arrangement, construction, and combination of devices, all of which I shall hereinafter fully explain and claim.

To enable others skilled in the art to make and use my invention, I will proceed to describe the exact manner in which I have carried it out.

In constructing my machine I provide a wagon, A, and mounted thereon at its middle and near the rear end is an upright hollow post, B. This post, which is constructed preferably of gas-pipe, is suitably secured to the wagon-frame or to the frame of the loader, and in its rear side is formed a slot, 2, extending nearly the entire length of the post.

C represents a pipe whose diameter is slightly less than the inner diameter of the post which enables the said pipe to have a vertical sliding movement.

To the lower end of pipe C is attached a cord or chain, $a$, which, after passing through the slot 2, extends upward through a guide, 3, secured to the post, thence over a sheave, 5, secured to the post near its top, and thence downward to a drum, $a'$, which is mounted upon the frame of the loader. The shaft of the drum is provided with cranks or handles for operating the drum to cause the pipe C to move upward or downward within the post. By means of this telescopic derrick I am enabled to adjust my loading apparatus to "racks" of different heights—a feature that is greatly desired—and this is accomplished by simply winding the cord or chain $a$ around the drum until the desired height is obtained, when the pipe C is held in that position by a suitable pawl-and-ratchet mechanism, $b$. (See Fig. 2.) The tube C is bent at right angles to form an arm, $c$, and to this arm $c$ are attached suitable guide-pulleys, 6 and 7, over which a rope or chain passes, for a purpose hereinafter set forth.

$d$ represents suitable bearings for a shaft, 8, on which is mounted a drum, D, which is also provided with a pawl-and-ratchet mechanism, $b'$. To the drum D is attached the cord $e$, which passes upward and over the pulleys 6 and 7, and thence to a hay-fork, to which it is attached, as shown in Fig. 1.

Upon the shaft 8 is a sleeve, 9, carrying a pinion, 10, which meshes with a gear-wheel, 11, secured to the inside of one of the drive-wheels. The pinion 10 may be connected or disconnected from the gear-wheel 11 by a lever having a bifurcated end which engages the sleeve 9. When thus arranged, if the pinion 10 be thrown in contact with the gear 11 and the wagon started, the drum will be rotated in the direction shown by the arrow, and the rope C will begin to wind, carrying with it the hay-fork. By disconnecting these parts the hay-fork will descend by its own weight or by the use of a cord, which may be connected to the fork-handle.

By the construction above referred to I am enabled to provide a simple and effective hay-loader, and one that can be adjusted to load or unload racks of different heights.

I am aware it is not new in hay-loaders to attach a derrick to the rear of a wagon-body, and to suspend a hay-fork to a cord for raising the hay. These features I therefore do not, broadly, claim; but What I do claim, and desire to secure by Letters Patent, is—

1. The combination, with the frame of a wagon, of a derrick composed of tubular telescopic sections, the outer or stationary section having a slot extending nearly its entire length and the inner section moving in a vertical plane and adjusted to different heights by means of a cord or chain, $a$, and a winding mechanism, and a pin secured to the inner section and engaging the slot in the outer section, whereby the adjustable section is prevented from rotating, substantially as herein described.

2. In a hay-loader, and in combination with a wagon-body, the drum D, the sleeve 9, pinion 10, gear-wheel 11, the cords $e$ and $a$, the drum $a'$, a suitable fork, and the telescopic sections of tubular material with their guide-pulleys, substantially as described.

KIRKE E. LATHROP.

Witnesses:
JAMES W. McDILL,
E. F. SULLIVAN.